United States Patent
Chun et al.

(10) Patent No.: US 11,876,447 B2
(45) Date of Patent: Jan. 16, 2024

(54) DEVICE AND METHOD FOR CONTROLLING CONVERTER

(71) Applicants: Hyundai Motor Company, Seoul (KR); Kia Corporation, Seoul (KR)

(72) Inventors: Shin Hye Chun, Seoul (KR); Dong Gyun Woo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 68 days.

(21) Appl. No.: 17/509,721

(22) Filed: Oct. 25, 2021

(65) Prior Publication Data

US 2022/0368224 A1 Nov. 17, 2022

(30) Foreign Application Priority Data

May 11, 2021 (KR) .................. 10-2021-0060931

(51) Int. Cl.
*H02M 3/156* (2006.01)
*H02J 7/00* (2006.01)

(52) U.S. Cl.
CPC ............. *H02M 3/156* (2013.01); *H02J 7/007* (2013.01); *H02J 2207/20* (2020.01)

(58) Field of Classification Search
CPC ...... H02M 3/156; H02M 3/157; H02M 3/158; H02M 3/1557; H02M 3/155; H02J 7/007; H02J 7/00711; H02J 2207/20
See application file for complete search history.

(56) References Cited

U.S. PATENT DOCUMENTS

| 2008/0164859 A1* | 7/2008 | Peng ................. H02M 3/157 323/318 |
| 2010/0270989 A1* | 10/2010 | Sasaki .............. H02M 3/1588 323/282 |
| 2014/0247029 A1* | 9/2014 | Krabbenborg ....... H02M 3/156 323/282 |

FOREIGN PATENT DOCUMENTS

KR 101339279 B1 1/2014

* cited by examiner

*Primary Examiner* — Nguyen Tran
(74) *Attorney, Agent, or Firm* — Fox Rothschild LLP

(57) ABSTRACT

A device for controlling a converter has a first output variable and a second output variable adjusted by a duty of a switching element. The device includes a first controller that generates a first duty based on a first error between a predetermined limitation reference value corresponding to a reference value limiting a size of the first output variable and a measurement value of the first output variable measured at a load of a converter. A second controller generates a second duty based on a second error between a predetermined reference value of the second output variable and a measurement value of the second output variable measured at the load of the converter. A duty determination unit derives a final duty of the switching element based on the first duty and the second duty.

13 Claims, 5 Drawing Sheets

DEVICE AND METHOD FOR CONTROLLING CONVERTER

CROSS-REFERENCE TO RELATED APPLICATION

This application claims priority to Korean Patent Application No. 10-2021-0060931, filed on May 11, 2021, in the Korean Intellectual Property Office, the disclosure of which is incorporated herein by reference.

BACKGROUND OF THE DISCLOSURE

1. Field of the Disclosure

The present disclosure relates to a device and method for controlling a converter, and more specifically, to a device and method for controlling a converter adjusted by a duty of a switching element, which provides a wide upper range of a control band and secure stable control performance for compensating for disturbance with respect to a rapidly changing load by limiting an output through a limited duty value derived from control loops connected in parallel.

2. Description of the Related Art

When resonance of a fixed frequency occurs due to hardware constituting a boost or buck converter, a converter controller operates the converter such that the resonance is attenuated to eliminate the influence of the resonance. However, if a hardware resonant frequency and a control band of the converter are close to each other, methods for solving the problem through converter control are limited. To solve this, methods of changing unique characteristics of hardware having resonance (shifting a resonant frequency) by redesigning the hardware or applying a controller in a new configuration changed from a basic structure may be conceived.

In general, cascade control is widely used because it has fast and stable response to disturbance. In this control, however, an inner loop requires faster response than an outer loop to prevent interference between two or more feedback loops. Accordingly, when upward shift of the control band of the inner loop is limited due to the characteristics of a plant having resonance caused by hardware, upward shift of the band of the outer loop is naturally limited. Particularly, it is difficult for conventional control to achieve fast response. Accordingly, there is a need for a control method for stabilizing a system by preventing deterioration of transient response performance and decreasing a likelihood of generation of over-voltage/overcurrent in a converter control field.

It will be understood that the above matters described in the related art are merely for promotion of understanding of the background of the disclosure and should not be recognized as prior art well-known to those skilled in the art.

SUMMARY OF THE DISCLOSURE

Therefore, the present disclosure has been made in view of the above problems, and it is an object of the present disclosure to provide a device and method for controlling a converter adjusted by a duty of a switching element, which may provide a wide upper range of a control band and secure stable control performance for compensating for disturbance with respect to a rapidly changing load by limiting an output through a limited duty value derived from control loops connected in parallel.

In accordance with the present disclosure, the above and other objects may be accomplished by the provision of a device for controlling a converter having a first output variable and a second output variable adjusted by a duty of a switching element, including a first controller configured to generate a first duty based on a first error between a predetermined limitation reference value corresponding to a reference value limiting a size of the first output variable and a measurement value of the first output variable measured at a load of a converter, a second controller configured to generate a second duty based on a second error between a predetermined reference value of the second output variable and a measurement value of the second output variable measured at the load of the converter, and a duty determination unit configured to derive a final duty of the switching element based on the first duty and the second duty.

The duty determination unit may be configured to derive a smaller value between the first duty and the second duty as the final duty. The duty determination unit may be configured to derive a representative value between the first duty and the second duty as the final duty. The first output variable may be an output current and the second output variable may be an output voltage.

The limitation reference value may decrease as the measurement value of the first output variable or the measurement value of the second output variable, measured at the load of the converter, or temperature of the converter increases. The limitation reference value may decrease as a discharge amount of a battery increases. The first controller may include efficiency data with respect to a relation between the second output variable and efficiency, and the limitation reference value may be the first output variable matching the second output variable according to a maximum efficiency point.

In accordance with another aspect of the present disclosure, a method for controlling a converter having a first output variable and a second output variable adjusted by a duty of a switching element, may include generating, by a first controller, a first duty based on a first error between a predetermined limitation reference value corresponding to a reference value limiting a size of the first output variable and a measurement value of the first output variable measured at a load of a converter, generating, by a second controller, a second duty based on a second error between a predetermined reference value of the second output variable and a measurement value of the second output variable measured at the load of the converter, and deriving, by a duty determination unit, a final duty of the switching element based on the first duty and the second duty.

The deriving of the final duty of the switching element may include deriving a smaller value between the first duty and the second duty as the final duty. The first output variable may be an output current in the generating of the first duty, and the second output variable may be an output voltage in the generating of the second duty.

The limitation reference value may decrease as a discharge amount of a battery increases in the generating of the first duty. The limitation reference value may decrease as the measurement value of the first output variable or the measurement value of the second output variable, measured at the load of the converter, or temperature of the converter increases in the generating of the first duty.

Efficiency data with respect to a relation between the second output variable and efficiency may be provided, and the limitation reference value may be the first output variable matching the second output variable according to a maximum efficiency point in the generating of the first duty.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
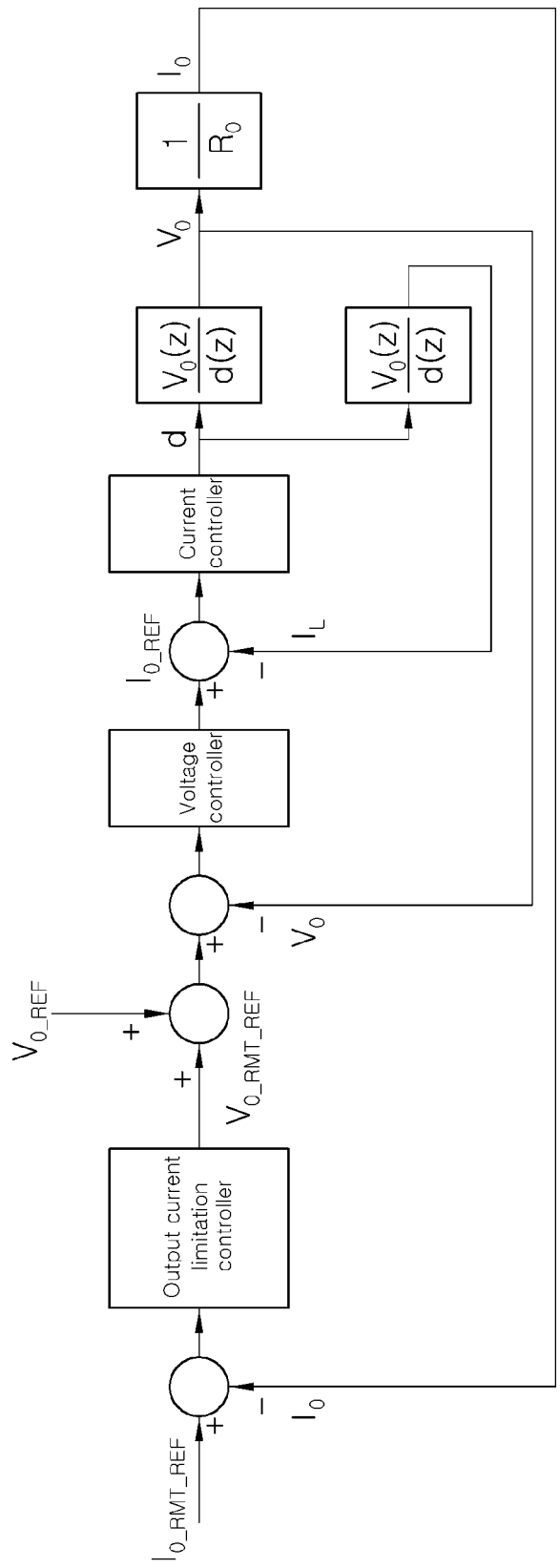
FIG. 1 is a block diagram of a general converter control device for limiting output.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions of embodiments of the present disclosure disclosed in the present specification or application are illustrated for the purpose of describing embodiments according to the present disclosure, and embodiments according to the present disclosure may be implemented in various forms and should not be construed as being limited to the embodiments described in the present specification and application. Hereinafter, embodiments of the present disclosure will be described in detail with reference to the attached drawings.

Figure 2:
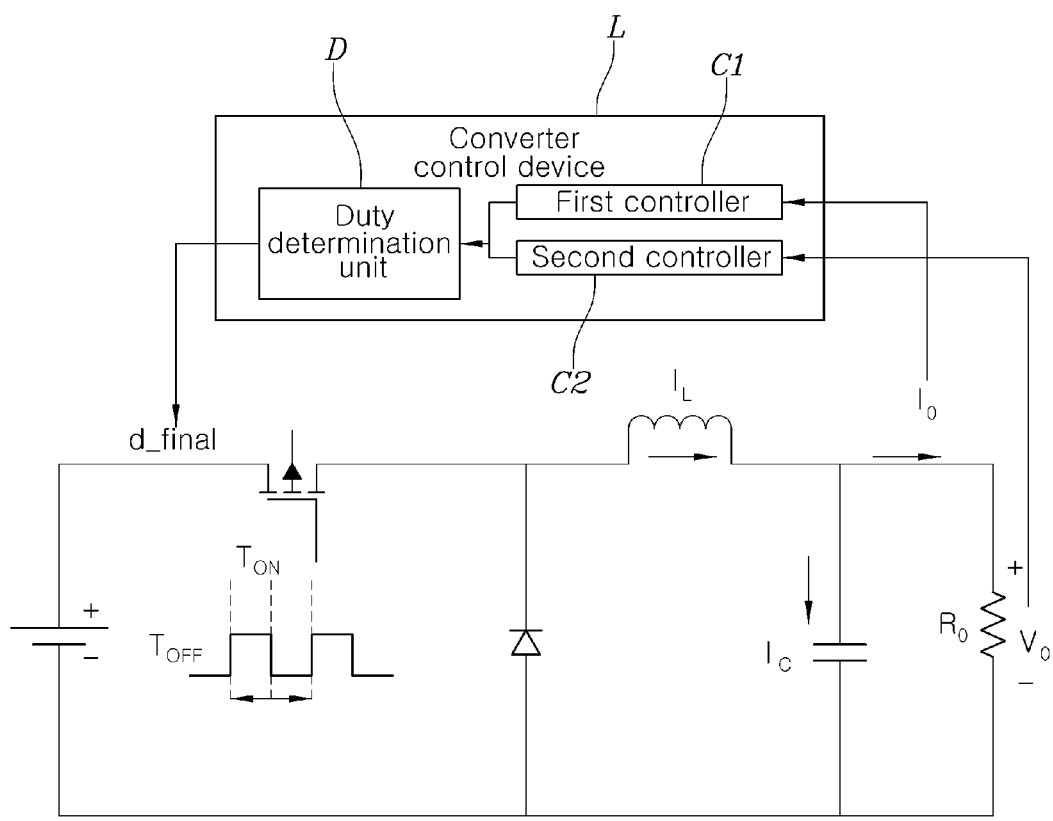
FIG. 2 and FIG. 3 are configuration diagrams of a device for controlling a converter according to an embodiment of the present disclosure.
Figure 3:
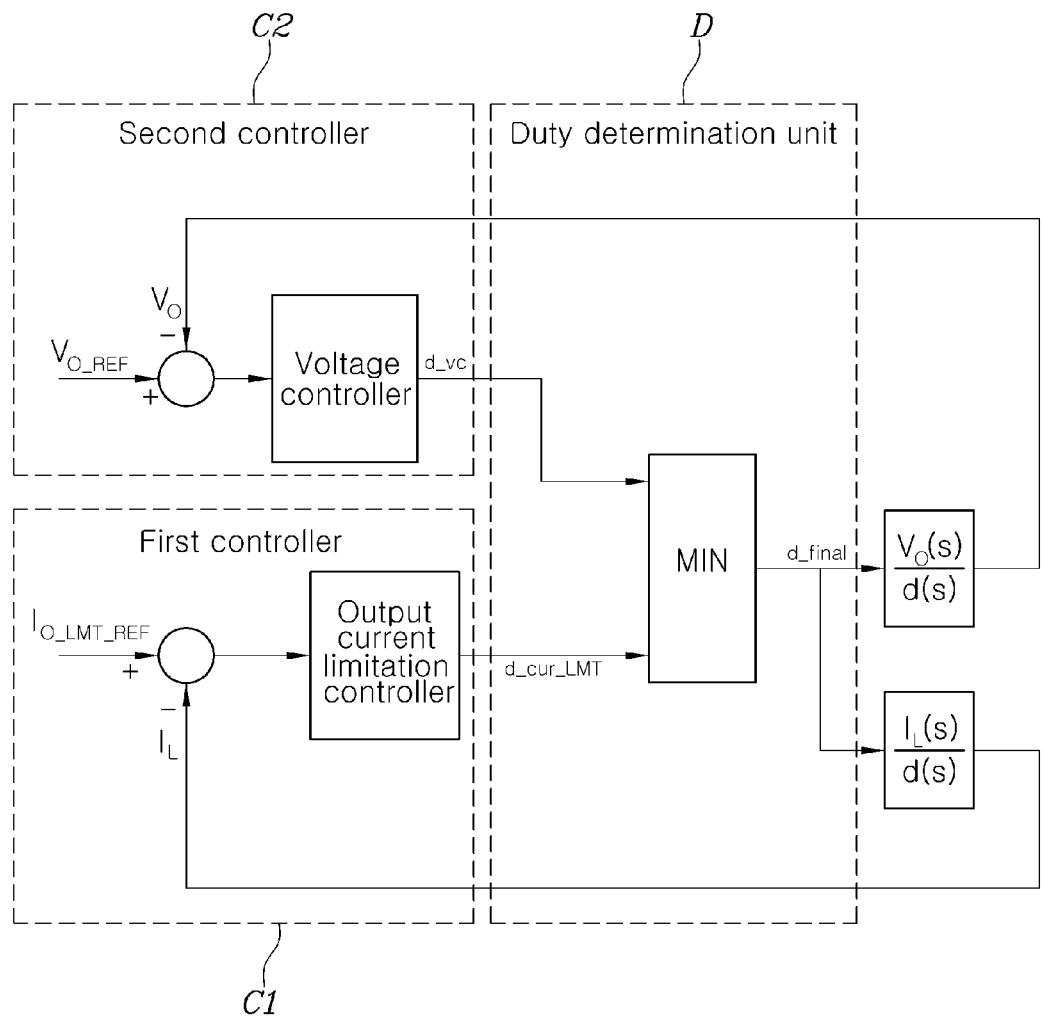
Figure 4:
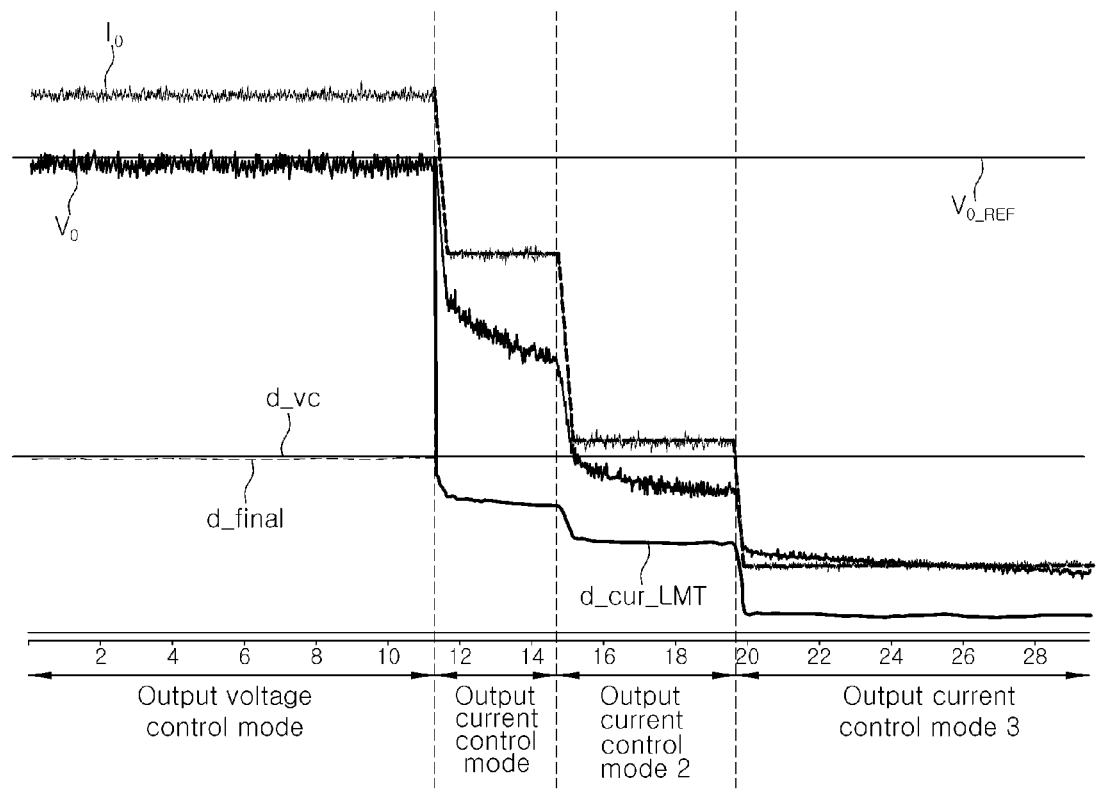
FIG. 4 is a graph showing results of application of the device for controlling a converter according to an embodiment of the present disclosure with time.
Figure 5:
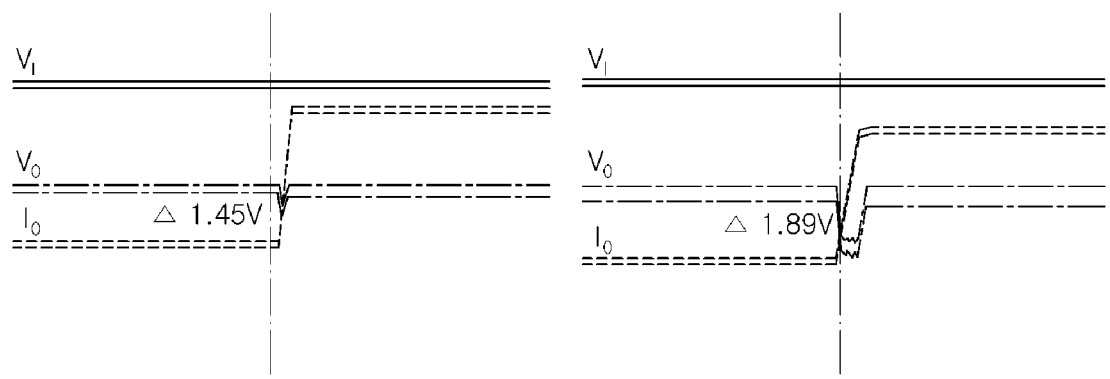
FIG. 5 is a graph showing compensation control of a general converter control device and the converter control device according to an embodiment of the present disclosure according to disturbance.
Figure 6:
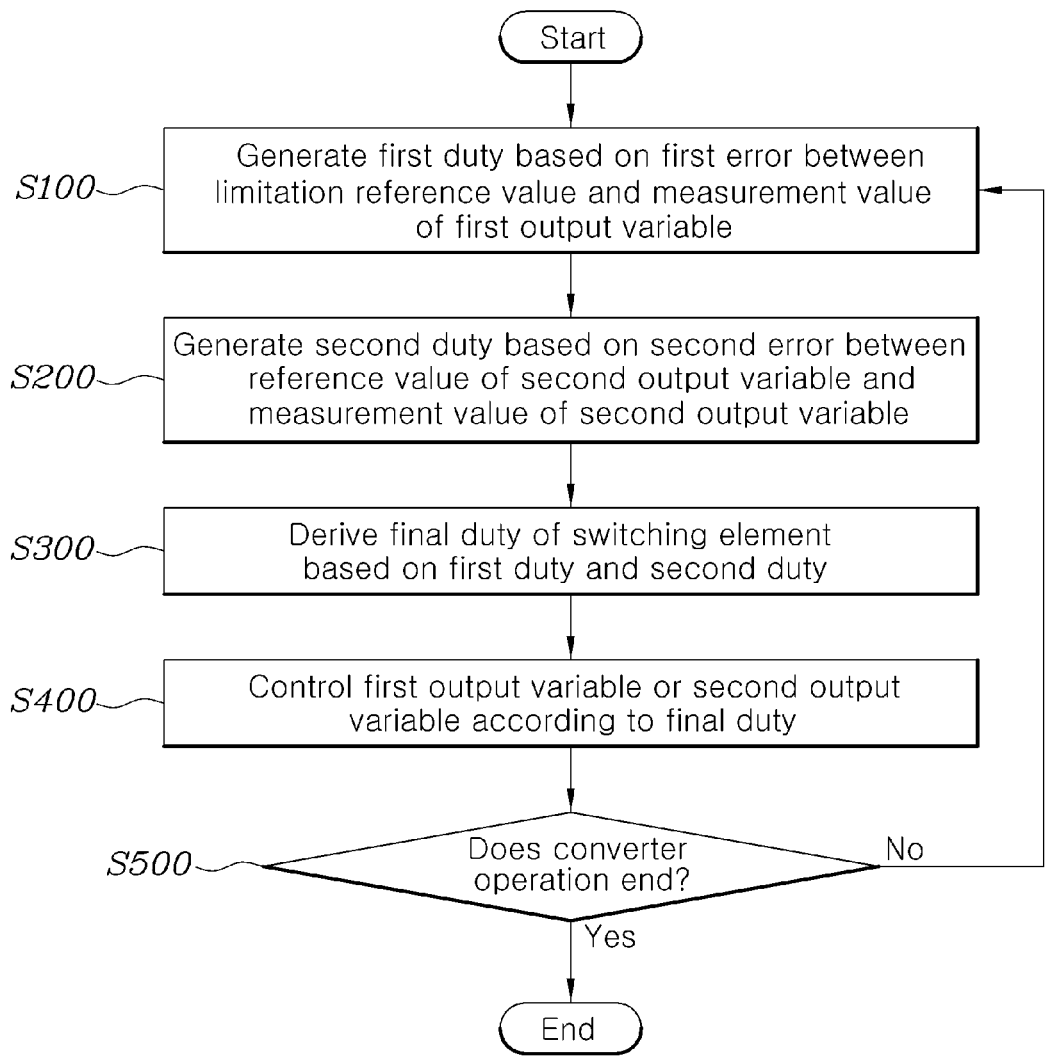
FIG. 6 is a flowchart illustrating a method for controlling a converter according to an embodiment of the present disclosure.

FIG. 1 is a block diagram of a general converter control device for limiting output, FIG. 2 and FIG. 3 are configuration diagrams of a device for controlling a converter according to an embodiment of the present disclosure, FIG. 4 is a graph showing results of application of the device for controlling a converter according to an embodiment of the present disclosure with time, FIG. 5 is a graph showing compensation control of a general converter control device and the converter control device according to an embodiment of the present disclosure according to disturbance, and FIG. 6 is a flowchart illustrating a method for controlling a converter according to an embodiment of the present disclosure.

FIG. 1 is a block diagram of a general converter control device for limiting output. A converter control device is generally a system (cascade control) for controlling a multilayer loop. In particular, since a converter has faster inductor current response than charging/discharging response of a battery voltage in general, an inner (subordinate) loop may include a current controller and an outer (main) loop may include a voltage controller. The current controller of the inner loop receives an error between a current reference value $I_{O\_REF}$ and an inductor current $I_L$ and outputs a duty d based on the error. The duty d is a value Ton/T obtained by dividing a switch turn-on time Ton other than a switching turn-off period Toff in a switch period T by the switching period T. Thereafter, the duty of the result value of the current controller is transferred through a transfer function $$\left(\frac{V_0(z)}{d(z)}\right);$$

converter transfer function (output voltage to duty)) of the inner loop and a transfer function $$\left(\frac{I_L(z)}{d(z)}\right);$$

converter transfer function (inductor output current to duty)) of the outer loop and input to each inner loop and the outer loop as an inductor output current $I_L$ of the inner loop and an output voltage $V_O$ or output current $I_O$ of the outer loop.

In addition, the voltage controller of the outer loop in FIG. 1 receives an error between a voltage reference value $V_{O\_REF}$ and the output voltage $V_O$ and outputs the current reference value $I_{O\_REF}$ based on the error. In particular, the voltage reference value $V_{O\_REF}$ may be limited, that is, reduced by receiving an output voltage limitation reference value $V_{O\_RMT\_REF}$ having a negative value through an output current limitation controller. The output voltage limitation reference value is output based on an error between the output current $I_O$ and an output current limitation reference value $I_{O\_RMT\_REF}$.

In this manner, the cascade control of FIG. 1 has fast response to disturbance through two controls and thus may control rapid disturbance within a stable range. Further, the cascade control may control a wide range of disturbance within a stable range according to high stability for disturbance by preventing variation (disturbance) in a subordinate control amount from affecting a main control amount. However, in the cascade control, an output value of the inner loop is adjusted by an input value of the outer loop and thus has dependency. Accordingly, when a control band of the outer loop dependently adjusted in the cascade control and a resonant frequency of the inner loop that performs control are close to each other, mutual interference occurs due to resonance therebetween. To prevent this, the inner loop needs to have fast response at least five to ten times that of the outer loop. However, when the control band of the inner loop of the cascade control of FIG. 1 is intended to be shifted upward, it is limited due to dependency of the response of the inner loop. Accordingly, it is also difficult to shift the control band of the outer loop upward.

Therefore, an embodiment of the present disclosure is a controller configuration for solving such a problem. In other words, an embodiment of the present disclosure operates a converter through output values of a first controller C1 and a second controller C2 to escape from the dependency of cascade. Accordingly, it is possible to design a response speed suitable for a control purpose and thus a degree of freedom in band design is improved through a device for controlling a converter of the present embodiment.

FIG. 2 and FIG. 3 are configuration diagrams illustrating a device for controlling a converter according to an embodiment of the present disclosure. The device for controlling a converter having a first output variable and a second output variable adjusted by a duty of a switching element according to the present disclosure in FIG. 2 and FIG. 3 includes a first controller configured to generate a first duty based on a first error between a predetermined limitation reference value that is a reference value limiting the size of the first output variable and a measurement value of the first output variable measured at a load of the converter, a second controller configured to generate a second duty based on a second error between a predetermined reference value of the second output variable and a measurement value of the second output variable measured at the load of the converter, and a duty determination unit configured to derive a final duty of the switching element based on the first duty and the second duty.

A circuit diagram in the lower part of FIG. 2 is a circuit diagram of a buck converter which shows connection of a switching element (e.g., MOSFET) having a duty d, a diode, an inductor, and a conductor. In particular, a converter control device L according to an embodiment of the present disclosure receives the first output variable and the second output variable including an output current $I_O$ or an output voltage $V_O$ measured at a load $R_O$. The first controller C1 may be configured to generate the first duty based on the first error between the predetermined limiting reference value and the measurement value of the first output variable. The second controller C2 may be configured to generate the second duty based on the second error between the predetermined reference value of the second output variable and the measurement value of the second output variable. In particular, the first duty or the second duty is a value Ton/T obtained by dividing a switch turn-on time Ton other than a switch turn-off period Toff in a switch period T of the first output variable or the second output variable by the switch period T. In addition, the duty determination unit D may be configured to derive a final duty d_final of the switching element based on the first duty and the second duty. This final duty d_final is a final duty of the first output variable and/or the second output variable and finally adjust the output of the converter upon input of the first output variable/second output variable transferred through transfer functions $$\frac{V_0(s)}{d(s)} \text{ and } \frac{I_L(s)}{d(s)}.$$

Further, the first controller C1 and the second controller C2 may be configured to repeatedly perform the aforementioned control.

FIG. 3 is a configuration diagram showing a converter control device according to an embodiment of the present disclosure. Particularly, the embodiment shown in FIG. 3 is a converter control device having an output current and an output voltage as the first output variable and the second output variable. In FIG. 3, blocks corresponding to the first controller C1, the second controller C2, and the duty determination unit D of the present embodiment are divided by dotted lines. The first controller C1 may be configured to generate an output current limitation controller output duty d_cur_LMT that is a first duty based on an error between an inductor output current $I_L$ adjusted by a final duty d_final and a limitation reference value $I_{O\_LMT\_REF}$ of the first output variable. The second controller C2 may be configured to generate an output voltage controller output duty d_vc that is a second duty based on an error between an output voltage $V_O$ controlled by the final duty d_final and a voltage reference value $V_{O\_REF}$. The duty determination unit D may be configured to derive the final duty d_final of a switching element which is a minimum value based on the first duty and the second duty. The final duty d_final is fed back to the inductor current $I_L$ as the output current that is the first output variable or the output voltage $V_O$ that is the second output variable through a transfer function $$\frac{V_0(s)}{d(s)} \text{ or } \frac{I_L(s)}{d(s)}$$

of the first duty (or the second duty).

As described above, in the converter control device according to an embodiment of the present disclosure, the first/second duty may be independently derived based on the error between the first/second output variable and the (limitation) reference value. Accordingly, dependency between an outer loop and an inner loop with respect to control response does not exist differently from the converter control device of FIG. 1. Therefore, even when a resonant frequency and a control band are close to each other, the converter control device of the embodiment shown in FIG. 2 may freely shift a control band upward to avoid mutual interference. Accordingly, the present embodiment improves transient response performance and prevents abrupt load change or generation of overcurrent in advance to enhance system stability.

In addition, the converter control device according to an embodiment of the present disclosure may reduce an operation amount and operation time of control to increase an operation speed. Conventional cascade control requires at least three steps of passing through the output current limitation controller, the voltage controller, and the current controller to derive the final duty d_final. Further, conventional cascade control includes three standby times for waiting for output values of the three steps due to dependency. On the other hand, in the present embodiment, the first output variable and/or the second output variable may be adjusted by the final duty derived based on the first duty/second duty. In other words, only operations of two steps are repeatedly performed in the present embodiment. In addition, the present embodiment does not require two standby times for waiting for output values of the two steps due to independency. Accordingly, the present embodiment reduces an operation amount and a standby time of control to increase an operation speed. This decreases a load rate of a microcontroller that performs final control.

Although the buck converter is illustrated as a converter in FIG. 2, the converter, which is a device for converting power, may include an AC-DC converter, a DC-DC converter, a DC-AC converter, and an AC-AC converter according to power type before and after conversion. Further, the converter may include a boost converter, a buck-boost converter, a full-bridge converter, a half-bridge converter, a push-pull converter, a booster-half-bridge converter, or a combination thereof as a power conversion device. In addition, the first and second controllers C1 and C2 that generate the first duty and the second duty based on the first error and the second error may be configured to execute basic control such as PD control and PID control, PI-D control and PI-PD control as two-degree-of-freedom control in which different controllers are provided on a feedforward path and a feedback path, lag compensation control, lead-lag compensation control, and series combination or parallel compensation thereof. Accordingly, the first and second controllers may be designed in a control scheme selected therefrom according to the property, stability, operation amount, and operation speed of a control target.

Furthermore, the number of predetermined limitation reference values that are reference values limiting the size of the first output variable and the number of predetermined reference values of the second output variable may be one or more. When there are a plurality of limitation reference values and reference values, a criterion for switching between the reference values may depend on parameters that are accumulated according to usage of the converter and increase or decrease, such as a converter (time-average) output value for a specific time. The parameters may include a (time-average) output of the converter, a converter input voltage $V_I$, a converter output voltage $V_O$, temperature variation according to output of the converter, and an input/output voltage $V_I$ matching a maximum efficiency point of the converter. In other words, when the average output of the converter increases to exceed reference values such as a first output, a second output, and a third output, the output of the converter may be limited by a method of introducing a lower limitation reference value or reference value.

Particularly, the first output variable and the second output variable are variables that increase as the output of the converter increases. The first/second output variable may be one of an output value, the output current $I_O$ such as the inductor current $I_L$, and the output voltage $V_O$. Further, the first/second output variable may be a value derived as a combination of the aforementioned three variables or a weight. The weight may be calculated based on efficiency according to the output voltage $V_O$ and the output current $I_O$ or a power factor that is a cosine value of a phase difference. In addition, the first/second output variable may be temperature variation in the converter or a discharge amount of a battery connected in parallel to the converter which increases as the output of the converter increases. The final duty d_final is a value obtained by dividing the switch turn-on period Ton by the switching period T and may be derived by adjusting the switch turn-on period Ton or the switching period T. In the former case, the width of a switching signal is controlled and a switching frequency is constant in the corresponding embodiment and thus switching noise can be predicted and filtering processing is facilitated. In the latter case, the frequency of the switching signal is modulated and switching loss may be reduced when a load amount of the converter is small in the corresponding embodiment.

The duty determination unit D of the converter control device according to an embodiment of the present disclosure may be configured to derive a smaller value between the first duty and the second duty as the final duty d_final. FIG. 4 is a graph showing results of application of the converter control device according to an embodiment of the present disclosure with time, and FIG. 5 is a graph showing compensation control of a general converter control device and the converter control device according to an embodiment of the present disclosure according to disturbance. As another embodiment, the duty determination unit may be configured to derive a representative value between the first duty and the second duty as the final duty. In other words, the present embodiment may derive an optimal final duty by selecting the first duty or the second duty or combining the first duty and the second duty.

FIG. 4 is a graph showing results of application of the converter control device according to an embodiment of the present disclosure with time. Particularly, FIG. 4 is a graph showing correlation of converter outputs tested by implementing a controller using C code and executing the controller. In FIG. 4, the first output variable is set to the output current $I_O$ and the second output variable is set to the output voltage $V_O$. In addition, an output voltage controller output duty d_vc in a first stage and an output current limitation controller output duty d_cur_LMT lower than the output voltage controller output duty d_vc and decreasing in stages in a third stage are set as duties in an embodiment of FIG. 4. The duty determination unit D may be configured to derive a minimum value of the first/second duties as the final duty d_final.

As a result, in the first period in which the output voltage controller performs control in FIG. 4, the output voltage corresponding to the second output variable may be adjusted by the output voltage controller output duty d_vc that is a minimum value between the two duties. In second to fourth periods, the output current corresponding to the first output variable may be adjusted by the output current limitation controller output duty d_cur_LMT that is a minimum value between the two duties. Thereafter, control enters one of output current limitation modes 1, 2 and 3 according to preset output limitation conditions. Particularly, a parameter accumulated according to an output amount applied to the output terminal of the converter is set to an output limitation condition, and the output current limitation controller output duty d_cur_LMT is reduced in stages whenever the parameter becomes a specific value or more in FIG. 4.

Accordingly, the converter output may be operated by the output current limitation controller output duty d_cur_LMT decreasing according to the converter output amount for a specific time, which is a minimum value between the output current limitation controller output duty d_cur_LMT and the output voltage controller output duty d_vc in FIG. 4. Consequently, the output current $I_O$ controlled by the output current limitation controller output duty d_cur_LMT decreases in stages while entering output current limitation modes 1, 2 and 3 according to a specific output amount.

In addition, a battery may be connected in parallel to the output terminal of the converter in FIG. 4 in addition to a load $R_O$. Accordingly, when the converter control device L enters one of the output current limitation modes 1, 2 and 3, the converter control device L may be configured to output an output current corresponding to a specific percentage of a required load and the battery may be configured to output an output current corresponding to the remaining percentage. For example, when a current corresponding to about 80% of a required load of the system is limited in output current limitation mode 1, the battery outputs a current corresponding to about 20%. Accordingly, the output voltage $V_O$ of the output terminal of the converter decreases since the battery is in a discharged state in output current limitation modes 1, 2 and 3 in FIG. 4.

The duty determination unit D of the converter control device according to an embodiment of the present disclosure may be configured to derive a smaller value between the first duty and the second duty as the final duty d_final. FIG. 5 is a graph showing compensation control of a general converter control device and the converter control device according to an embodiment of the present disclosure according to disturbance. FIG. 5 shows control of an output voltage $V_O$ within a stabilized range in response to disturbance in an output current of a load, that is, rapid increase in an output current $I_O$, in comparison with the general converter control device on the left side when the same output value is increased under the same input voltage $V_I$. A gradation is 2 V in the left side and 1 V in the right side in FIG. 5, and the graphs on both sides show how fast output voltages with stabilized variation are output in a state in which the same output value has been increased. Distinguished from the general converter control device on the left of FIG. 5, stabilized compensation control (within 1.5 V) may be confirmed in the converter control device according to an embodiment of the present disclosure.

As described above, the duty determination unit D of the converter control device according to an embodiment of the present disclosure may be configured to derive a minimum value between the first and second duties as the final duty d_final such that an output limitation mode may be executed only when output limitation is required. In addition, when output limitation is required, the present embodiment may strengthen a degree of output limitation in stages by setting a plurality of predetermined lower output current limitation controller output duties d_cur_LMT. On the other hand, when output limitation is not required, the present embodiment may reduce a degree of output limitation by setting a single predetermined higher output voltage controller output duty d_vc, as shown in FIG. 4, or a plurality of predetermined higher output voltage controller output duties d_vc. Accordingly, the converter control device according to an embodiment of the present disclosure may flexibly design a degree of output limitation and selectively limit only a desired output variable (the first output variable or the second output variable) through derivation of a minimum value. Accordingly, the present embodiment may reduce an operation amount of control and control the converter stably and rapidly.

As another embodiment of the present disclosure, the duty determination unit D may be configured to derive a representative value between the first duty and the second duty as the final duty d_final. In particular, the representative value is a value representing a certain data set. In a parallel relationship between the first controller C1 and the second controller C2, the number of inner loops of each controller may be one or more. Accordingly, the number of each of the first duty and the second duty may be one or more. Therefore, selection of a minimum value between the first duty and the second duty as the final duty d_final in the above-described embodiment may bring about a result of limiting all loops of the first controller C1 or all loops of the second controller C2 to a minimum duty and selecting only one loop. This is not desirable because an optimal control value cannot be derived and a plurality of loops cannot be selected in a control system in which a plurality of first duties and second duties are derived through a plurality of loops. Accordingly, a converter control device according to another embodiment of the present disclosure which derives a representative value representing a duty set as a final duty may provide a control system optimized for a multisystem in which a plurality of output values is derived through a plurality of control variables and fed back.

Particularly, a representative value may be one of a mean, a median, a mode, and a percentile. A mean may be a power mean $$\left(M(k) = \left(\frac{1}{n}\sum a_i^k\right)^{1/k}\right),$$

an arithmetic mean (k=1) obtained by adding all of n variables according to data form and dividing the result by the number, a geometric mean (k=0) that is a square root of n of a product of n variables, or a harmonic mean (k=−1) that is a reciprocal of an arithmetic mean of reciprocals of n variables. An arithmetic mean may be a population mean, a sample mean that is a mean of sample data, or a weighted mean calculated by multiplying individual values by a weight.

A median is a value positioned at the center of variables aligned by size, a mode is a value of a highest frequency, and a percentile is a value of a specific position indicated in a percentage among variables aligned by size. For example, 20 percentile among 100 first duties and second duties is the twentieth smallest value among the 100 values. Further, when n variables include 0, a mean including a geometric mean can be calculated except 0. A mean including an arithmetic mean may exclude an outlier among n variables. In particular, the outlier may be a highest point, a lowest point, or a value within a specific range (e.g., 10%) of both extremes.

An arithmetic mean corresponding to a final duty derived by the control device according to an embodiment of the present disclosure may represent tendency of the duty, a geometric mean corresponding to the final duty may represent a mean of duty rates consecutive in time, and a harmonic mean corresponding to the final duty may represent the same proportion of samples among consecutive rates (e.g., a mean duty in multiple converters).

In FIG. 2 and FIG. 3 showing configurations of the converter control device according to an embodiment of the present disclosure, the first output variable may be an output current, and the second output variable may be an output voltage. In other words, the present embodiment derives the final duty d_final based on the output current limitation controller output duty d_cur_LMT and the output voltage controller output duty d_vc of the converter.

The converter may be configured to convert an output voltage type for an input voltage or increase or decrease the level of the output voltage, and the output voltage may be fixed based on a device that the converter intends to operate. Accordingly, to limit the output of the converter, it is desirable for the converter control device to limit the output current of the converter. Accordingly, the converter control device according to an embodiment of the present disclosure may be configured to cause the first controller C1 that performs control through a limitation reference value to limit the output current to stably supply power of a device that the converter intends to operate and to cope with a rapidly changing load. Therefore, the present embodiment may stably turn the device on/off while preventing deterioration of duration and performance of the device.

In FIG. 2 and FIG. 3 showing configurations of the converter control device according to an embodiment of the present disclosure, the limitation reference value may decrease as the measurement value of the first output variable or the measurement value of the second output variable, measured at the load of the converter, or the temperature of the converter increases. Further, the limitation reference value may decrease as a discharge amount of the battery increases. In other words, the limitation reference value of the present embodiment may be further limited according to parameters related to the load of the converter.

The limitation reference value is a reference value in a process in which the first controller C1 generates the first duty based on the first error. This is an output limitation value for coping with the rapidly changing load of the converter. Particularly, it is also possible to cope with the load of the converter through measurement values of the first output variable and the second output variable of the converter, or the temperature or the amount of heat of the converter which increases as the first output variable and/or the second output variable increases. Accordingly, the converter control device according to the present embodiment may raise the output limitation stage based on a degree of load by reducing the limitation reference value as a measurement value of the first output variable or a measurement value of the second output variable which is generated in response to the load of the converter for a specific time increases.

In addition, when a battery is connected in parallel to the converter and thus the converter copes with the output of the load along with the battery, the battery copes with a part of the load of the converter. Further, a part of the output of the converter may be used to charge the battery. Accordingly, a degree of the load may be determined by the discharge amount of the battery. Particularly, a part of the load may be driven by the battery to improve the fuel efficiency of a fuel cell for driving mobility or a device connected to the battery, an energy generator such as an internal combustion engine, or a driving device or to prevent deterioration of durability thereof. In particular, the battery needs to have a minimum charging amount to cope with the load. Then, the output of the converter serving to charge the battery needs to be further limited. Accordingly, the converter control device according to the present embodiment may raise the output limitation stage according to a degree of load in a system that reduces a limitation reference value as the amount of discharge of a battery such that the battery and a converter generate outputs together.

In FIG. 2 and FIG. 3 showing configurations of the converter control device according to an embodiment of the present disclosure, the first controller C1 may include efficiency data with respect to a relation between the second output variable and efficiency, and the limitation reference value may be the first output variable matching the second output variable according to a maximum efficiency point. In other words, when the converter control device enters an output limitation mode, the converter control device may be configured to operate the converter such that the converter output approaches an output at the maximum efficiency point.

The output of the converter may be operated based on a required load of a vehicle (load following) in general. However, in the case of output limitation, that is, when the first output variable or the first controller C1 is limited to a preset value according to the final duty d_final of the switching element, the converter may be configured to arbitrarily adjust the second output variable to maximize output efficiency. Particularly, when the first output variable is the output current and the second output variable is the output voltage, the converter control device may include efficiency data about relation with efficiency in a relationship between a product of an output current and an output voltage and an input voltage in an output current-output voltage graph. In particular, an output current matching an output voltage according to the maximum efficiency point may be set to a limitation reference value. Consequently, the present embodiment increases a high-efficiency operation period of the converter in an output limitation state. The constant current control of the converter control device according to an embodiment of the present disclosure may stabilize a device and a system to which power from the converter is output, strengthen protection of the converter, and cause the corresponding system to efficiently operate.

In particular, the efficiency is a ratio of output power to input power. The efficiency varies according to an output current suitable for an output voltage in accordance with characteristics of each device driven by the converter. Accordingly, when the converter provides output required by a system along with a battery, if the output and charging amount of the battery are insufficient or sufficient, the converter may be operated such that the output reaches the maximum efficiency point. In addition, power conversion including AC power distribution may include a power factor as efficiency. The power factor is a ratio of active power for which a load is used to apparent power that is AC transmission power. A phase deviation according to a capacitive load or an inductive load causes generation of a large transient current including a high-frequency or low-frequency component, and when an output current having the same peak value is maintained, higher input power is required. Accordingly, a power converter having a low power factor has low efficiency. Therefore, the efficiency includes efficiency of quantitative energy and a power factor of qualitative energy. This may be accompanied by control of a power factor correction (PFC) device.

FIG. 6 is a flowchart illustrating a method for controlling a converter according to an embodiment of the present disclosure. The method for controlling a converter having a first output variable and a second output variable adjusted by a duty of a switching element according to the present disclosure may include a step S100 in which a first controller generates a first duty based on a first error between a predetermined limitation reference value that is a reference value limiting the size of the first output variable and a measurement value of the first output variable measured at a load of the converter, a step S200 in which a second controller generates a second duty based on a second error between a predetermined reference value of the second output variable and a measurement value of the second output variable measured at the load of the converter, and a step S300 in which a duty determination unit derives a final duty of the switching element based on the first duty and the second duty.

In the converter control method according to an embodiment of the present disclosure shown in FIG. 6, the first controller may be configured to generate the first duty based on the first error between the predetermined limitation reference value that is a reference value limiting the size of the first output variable and the measurement value of the first output variable measured at the load of the converter (S100). In particular, the number of limitation reference values may be one or more. Further, the first controller configured to generate the first duty may be configured to execute any one of basic control such as P control, PI control, PD control, PID control, lead compensation, lag compensation, and lead-lag compensation, two-degree-of-freedom control, and series compensation or parallel compensation thereof.

As the next step, the second controller may be configured to generate the second duty based on the second error between the predetermined reference value of the second output variable and the measurement value of the second output variable measured at the load of the converter (S200). The number of reference values may be one or more, as described above. When a plurality of reference values is provided, the criterion therefor may depend on the aforementioned parameters, and the second controller may be configured to execute any one of the aforementioned control schemes.

As the next step, the duty determination unit may be configured to derive the final duty of the switching element based on the first duty and the second duty (S300). In particular, the final duty d_final is a value obtained by dividing a switch turn-on period Ton by a switching period T and may be derived by adjusting the switch turn-on period Ton or the switching period T. Then, the first output variable or the second output variable may be adjusted according to the final duty (S400). Alternatively, the first output variable and the second output variable may be adjusted according to the final duty. Finally, whether the operation of the converter ends and control of the converter is completed may be checked (S500).

The converter control method according to an embodiment of the present disclosure shown in FIG. 6 generates the first duty based on the first error of the limitation reference value and then generates the second duty based on the second error of the reference value. Accordingly, the present embodiment increases an operation speed according to consistency of algorithm sequence. In addition, according to the converter control method according to an embodiment of the present disclosure, it may be possible to escape from dependency of general cascade control by operating the converter using output values of the first duty in the first controller and the second duty in the second controller. Accordingly, when a resonant frequency and a control band are close to each other, it may be possible to freely shift the control band upward to avoid mutual interference according to the converter control method shown in FIG. 6. Therefore, the converter control method according to the present embodiment improves transient response performance and prevents abrupt load change or generation of overcurrent in advance to enhance system stability.

In FIG. 6 showing a flowchart of the converter control method according to an embodiment of the present disclosure, a smaller value between the first duty and the second duty may be derived as the final duty in step S300 of deriving the final duty of the switching element. In other words, in the converter control method according to an embodiment of the present disclosure, the first controller may flexibly design a degree of output limitation using the limitation reference value and selectively limit only a desired output variable (e.g., the first output variable or the second output variable) through derivation of a minimum value. Accordingly, the converter control method according to an embodiment of the present disclosure may reduce the amount of operation and an operation time of control to increase an operation speed by selecting a small value between the first duty and the second duty. This decreases a load rate of a microcontroller that performs final control.

In FIG. 6 showing a flowchart of the converter control method according to an embodiment of the present disclosure, the first output variable may be an output current in step S100 of generating the first duty and the second output variable may be an output voltage in step S200 of generating the second duty. In other words, the converter control method according to an embodiment of the present disclosure may cause the first controller to limit the output current to stably supply power of a device that the converter intends to operate and to cope with a rapidly changing load. Therefore, the converter control method according to an embodiment of the present disclosure may stably turn the device on/off while preventing deterioration of durability and performance of the device.

In FIG. 6 showing a flowchart of the converter control method according to an embodiment of the present disclosure, the limitation reference value may decrease as the amount of discharge of a battery increases in step S100 of generating the first duty. When the battery is connected in parallel to the converter, the converter copes with an output of a load along with the battery and the battery copes with a part of the load of the converter. Further, a part of the output of the converter may be used to charge the battery. Accordingly, a degree of the load may be determined by the amount of discharge of the battery. Particularly, a part of the load may be driven by the battery to improve the fuel efficiency of a fuel cell for driving mobility or a device connected to the battery, an energy generator such as an internal combustion engine, or a driving device or to prevent deterioration of durability thereof. In particular, the battery needs to have a minimum charging amount to cope with the load. Then, the output of the converter serving to charge the battery needs to be further limited. Accordingly, the converter control method according to an embodiment of the present disclosure may raise an output limitation stage according to a degree of load in a system that reduces a limitation reference value as the amount of discharge of a battery such that the battery and a converter generate outputs together.

In FIG. 6 showing a flowchart of the converter control method according to an embodiment of the present disclosure, the limitation reference value may decrease as the measurement value of the first output variable or the measurement value of the second output variable, measured at the load of the converter, or the temperature of the converter increases in step S100 of generating the first duty. In particular, the limitation reference value is a reference value in a process in which the first controller generates the first duty based on the first error. This is an output limitation value for coping with the rapidly changing load of the converter. Particularly, it is also possible to cope with the load of the converter through measurement values of the first output variable and the second output variable of the converter, or the temperature or the amount of heat of the converter which increases as the first output variable and/or the second output variable increase. Accordingly, the converter control method according to an embodiment of the present disclosure may raise the output limitation stage depending on a degree of load by reducing the limitation reference value as the measurement value of the first output variable or the measurement value of the second output variable which is generated in response to the load of the converter for a specific time increases.

In FIG. 6 showing a flowchart of the converter control method according to an embodiment of the present disclosure, efficiency data about a relation between the second output variable and efficiency may be provided in the step of generating the first duty, and the limitation reference value may be the first output variable matching the second output variable according to a maximum efficiency point. In other words, when control enters an output limitation mode, the present embodiment may be configured to operate the converter such that the converter output approaches an output at the maximum efficiency point.

Particularly, when the first output variable is the output current and the second output variable is the output voltage, efficiency data about relation with efficiency in a relationship between a product of an output current and an output voltage and an input voltage in an output current-output voltage graph may be provided. In this case, an output current matching an output voltage according to the maximum efficiency point is set to a limitation reference value. Consequently, the present embodiment increases a high-efficiency operation period of the converter in an output limitation state. Such constant current control of the converter control method according to an embodiment of the present disclosure may stabilize a device and a system to which power from the converter is output, strengthen protection of the converter, and cause the corresponding system to efficiently operate.

The present disclosure relates to a converter control device and method, and more specifically, to a converter control device and method for limiting an output through duty values of controller connected in parallel. Particularly, the present disclosure may provide a wide upper range of a control band and secure stable control performance for compensating for disturbance with respect to a rapidly changing load by limiting an output through limited duty values derived from control loops connected in parallel.

When a hardware resonant frequency and a control band of a converter are close to each other, control performance becomes unstable due to mutual interference. Accordingly, the converter control device and method according to an embodiment of the present disclosure for solving such problems apply a controller in a new configuration changed from a basic structure. In cascade control generally used, an inner loop needs to always have faster response than an outer loop to prevent interference between two or more feedback loops. Accordingly, when upward shift of the control band of the inner loop is limited due to the characteristics of a plant having resonance caused by hardware, upward shift of the band of the outer loop is naturally limited. In particular, it is difficult for conventional control to achieve fast response in a low frequency band.

On the other hand, according to the converter control device and method according to an embodiment of the present disclosure, it may be possible to operate the converter through a final duty derived based on the first duty/second duty of the first controller C1 and the second controller C2 without dependency of cascade control. Accordingly, it may be possible to design a response speed suitable for a control purpose and improve a degree of freedom in band design through the converter control device and method according to an embodiment of the present disclosure. Therefore, the present embodiment is a new control solution for improving transient response performance and preventing abrupt load change or generation of overcurrent in advance to enhance system stability.

According to the device and method for controlling a converter adjusted by a duty of a switching element of the present disclosure, effects of providing a wide upper range of a control band and securing stable control performance for compensating for disturbance with respect to a rapidly changing load by limiting an output through limited duty values derived from control loops connected in parallel can be obtained.

Although specific embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A device for controlling a converter having a first output variable and a second output variable adjusted by a duty of a switching element, comprising:
   a first controller configured to generate a first duty based on a first error between a predetermined limitation reference value corresponding to a reference value limiting a size of the first output variable and a measurement value of the first output variable measured at a load of a converter;
   a second controller configured to generate a second duty based on a second error between a predetermined reference value of the second output variable and a measurement value of the second output variable measured at the load of the converter; and
   a duty determination unit configured to derive a final duty of the switching element based on the first duty and the second duty,
   wherein the first duty and the second duty are generated independently.

2. The device according to claim 1, wherein the duty determination unit is configured to derive a smaller value between the first duty and the second duty as the final duty.

3. The device according to claim 1, wherein the duty determination unit is configured to derive a representative value between the first duty and the second duty as the final duty.

4. The device according to claim 1, wherein the first output variable is an output current and the second output variable is an output voltage.

5. The device according to claim 1, wherein the limitation reference value decreases as the measurement value of the first output variable or the measurement value of the second output variable, measured at the load of the converter, or temperature of the converter increases.

6. The device according to claim 1, wherein the limitation reference value decreases as a discharge amount of a battery increases.

7. The device according to claim 1, wherein the first controller includes efficiency data with respect to a relation between the second output variable and efficiency, and the limitation reference value is the first output variable matching the second output variable according to a maximum efficiency point.

8. A method for controlling a converter having a first output variable and a second output variable adjusted by a duty of a switching element, comprising:
   generating, by a first controller, a first duty based on a first error between a predetermined limitation reference value corresponding to a reference value limiting a size of the first output variable and a measurement value of the first output variable measured at a load of a converter;
   generating, by a second controller, a second duty based on a second error between a predetermined reference value of the second output variable and a measurement value of the second output variable measured at the load of the converter; and
   deriving, by a duty determination unit, a final duty of the switching element based on the first duty and the second duty,
   wherein the first duty and the second duty are generated independently.

9. The method according to claim 8, wherein the deriving of the final duty of the switching element includes deriving a smaller value between the first duty and the second duty as the final duty.

10. The method according to claim 8, wherein the first output variable is an output current in the generating of the first duty, and the second output variable is an output voltage in the generating of the second duty.

11. The method according to claim 8, wherein the limitation reference value decreases as a discharge amount of a battery increases in the generating of the first duty.

12. The method according to claim 8, wherein the limitation reference value decreases as the measurement value of the first output variable or the measurement value of the second output variable, measured at the load of the converter, or temperature of the converter increases in the generating of the first duty.

13. The method according to claim 8, wherein efficiency data with respect to a relation between the second output variable and efficiency is provided, and the limitation reference value is the first output variable matching the second output variable according to a maximum efficiency point in the generating of the first duty.

* * * * *